United States Patent
Banik et al.

(10) Patent No.: US 10,669,603 B2
(45) Date of Patent: Jun. 2, 2020

(54) FLAT STEEL PRODUCT WITH AN AL-COATING, METHOD FOR PRODUCING THE SAME, STEEL COMPONENT AND METHOD FOR PRODUCING THE SAME

(71) Applicants: ThyssenKrupp Steel Europe AG, Duisburg (DE); ThyssenKrupp AG, Essen (DE)

(72) Inventors: Janko Banik, Altena (DE); Ulrich Etzold, Kerken (DE); Norbert Rössler, Düsseldorf (DE); Manuela Ruthenberg, Dortmund (DE); Thiemo Wuttke, Recklinghausen (DE)

(73) Assignees: ThyssenKrupp Steel Europe AG, Duisburg (DE); ThyssenKrupp AG, Essen (DE)

( * ) Notice: Subject to any disclaimer, the term of this patent is extended or adjusted under 35 U.S.C. 154(b) by 78 days.

(21) Appl. No.: 15/509,167

(22) PCT Filed: Aug. 26, 2015

(86) PCT No.: PCT/EP2015/069550
§ 371 (c)(1),
(2) Date: Mar. 6, 2017

(87) PCT Pub. No.: WO2016/034476
PCT Pub. Date: Mar. 10, 2016

(65) Prior Publication Data
US 2017/0260601 A1 Sep. 14, 2017

(30) Foreign Application Priority Data

Sep. 5, 2014 (EP) .................................. 14183757

(51) Int. Cl.
*C21D 8/00* (2006.01)
*C21D 9/00* (2006.01)
(Continued)

(52) U.S. Cl.
CPC .......... *C21D 9/0068* (2013.01); *B32B 15/012* (2013.01); *B32B 15/04* (2013.01);
(Continued)

(58) Field of Classification Search
CPC .... C23C 2/12; C23C 2/26; C23C 2/40; C23C 2/02; C23C 2/04; C23C 2/06;
(Continued)

(56) References Cited

U.S. PATENT DOCUMENTS 6,296,805 B1   10/2001 Laurent et al.
2010/0203357 A1  8/2010 Hori et al.
(Continued)

FOREIGN PATENT DOCUMENTS

CN    1531604 A    9/2004
CN    101765675 A   6/2010
(Continued)

OTHER PUBLICATIONS

Machine Translation, Maki et al., JP 2011-137210, Jul. 2011. (Year: 2011).*
(Continued)

*Primary Examiner* — Michael E. La Villa
(74) *Attorney, Agent, or Firm* — The Webb Law Firm

(57) ABSTRACT

A flat steel product for hot forming may be produced from a steel substrate that includes a steel comprising 0.1-3% by weight Mn and up to 0.01% by weight B, along with a protective coating that is applied to the steel substrate. The protective coating may be based on Al and may contain up to 20% by weight of other alloy elements. Also disclosed are methods for producing such flat steel products, steel components, and methods for producing steel components. Absorption of hydrogen is minimized during heating necessary for hot forming. This is achieved at least in part through an alloy constituent of 0.1-0.5% by weight of at
(Continued)

least one alkaline earth or transition metal in the protective coating, wherein an oxide of the alkaline earth or transition metal is formed on an outer surface of the protective coating during hot forming of the flat steel product.

15 Claims, 2 Drawing Sheets

(51) Int. Cl.
| | |
|---|---|
| C23C 2/40 | (2006.01) |
| C23C 2/12 | (2006.01) |
| C22C 38/32 | (2006.01) |
| C22C 38/22 | (2006.01) |
| C22C 38/06 | (2006.01) |
| C22C 38/04 | (2006.01) |
| C22C 38/02 | (2006.01) |
| C22C 38/00 | (2006.01) |
| C22C 38/28 | (2006.01) |
| C22C 21/02 | (2006.01) |
| C21D 1/673 | (2006.01) |
| C23C 2/26 | (2006.01) |
| C23C 30/00 | (2006.01) |
| C23C 28/00 | (2006.01) |
| C23C 2/02 | (2006.01) |
| C23C 2/06 | (2006.01) |
| C22C 21/08 | (2006.01) |
| C22C 21/12 | (2006.01) |
| C22C 21/16 | (2006.01) |
| C22C 21/06 | (2006.01) |
| C21D 8/02 | (2006.01) |
| B32B 15/04 | (2006.01) |
| B32B 15/18 | (2006.01) |
| B32B 15/01 | (2006.01) |

(52) U.S. Cl.
CPC ............ *B32B 15/043* (2013.01); *B32B 15/18* (2013.01); *C21D 1/673* (2013.01); *C21D 8/005* (2013.01); *C21D 8/02* (2013.01); *C21D 8/0205* (2013.01); *C21D 8/0247* (2013.01); *C22C 21/02* (2013.01); *C22C 21/06* (2013.01); *C22C 21/08* (2013.01); *C22C 21/12* (2013.01); *C22C 21/16* (2013.01); *C22C 38/002* (2013.01); *C22C 38/02* (2013.01); *C22C 38/04* (2013.01); *C22C 38/06* (2013.01); *C22C 38/22* (2013.01); *C22C 38/28* (2013.01); *C22C 38/32* (2013.01); *C23C 2/02* (2013.01); *C23C 2/06* (2013.01); *C23C 2/12* (2013.01); *C23C 2/26* (2013.01); *C23C 2/40* (2013.01); *C23C 28/32* (2013.01); *C23C 28/321* (2013.01); *C23C 28/345* (2013.01); *C23C 30/00* (2013.01); *C23C 30/005* (2013.01); *Y10T 428/1259* (2015.01); *Y10T 428/1266* (2015.01); *Y10T 428/12583* (2015.01); *Y10T 428/12597* (2015.01); *Y10T 428/12604* (2015.01); *Y10T 428/12611* (2015.01); *Y10T 428/12618* (2015.01); *Y10T 428/12667* (2015.01); *Y10T 428/12757* (2015.01); *Y10T 428/12972* (2015.01); *Y10T 428/12979* (2015.01); *Y10T 428/2495* (2015.01); *Y10T 428/24967* (2015.01); *Y10T 428/263* (2015.01); *Y10T 428/264* (2015.01); *Y10T 428/265* (2015.01)

(58) Field of Classification Search
CPC ....... C23C 30/00; C23C 30/005; C23C 28/32; C23C 28/321; C23C 28/345; C21D 1/673; C21D 9/0068; C21D 8/005; C21D 8/02; C21D 8/0205; C21D 8/0247; C22C 38/32; C22C 38/28; C22C 38/22; C22C 38/02; C22C 38/04; C22C 38/002; C22C 38/06; C22C 21/02; C22C 21/06; C22C 21/10; C22C 21/12; C22C 21/16; C22C 21/08; B32B 15/012; B32B 15/04; B32B 15/043; B32B 15/18; Y10T 428/12583; Y10T 428/1259; Y10T 428/12597; Y10T 428/12604; Y10T 428/12611; Y10T 428/12618; Y10T 428/1266; Y10T 428/12667; Y10T 428/12757; Y10T 428/12972; Y10T 428/12979; Y10T 428/2495; Y10T 428/24967; Y10T 428/263; Y10T 428/264; Y10T 428/265
See application file for complete search history.

(56) References Cited

U.S. PATENT DOCUMENTS

| | | |
|---|---|---|
| 2010/0294400 A1 | 11/2010 | Lupp et al. |
| 2012/0085467 A1 | 4/2012 | Thirion et al. |
| 2013/0236739 A1 | 9/2013 | Yoshida et al. |
| 2014/0030544 A1 | 1/2014 | Maki et al. |

FOREIGN PATENT DOCUMENTS

| | | |
|---|---|---|
| CN | 103228812 A | 7/2013 |
| DE | 10235909 A1 | 2/2004 |
| EP | 1767286 A1 | 3/2007 |
| EP | 2045360 A1 | 4/2009 |
| EP | 2377965 A2 | 10/2011 |
| JP | 11152555 A | 6/1999 |
| JP | 2005238286 A | 9/2005 |
| JP | 2006 299377 A | 11/2006 |
| JP | 2009120942 A | 6/2009 |
| JP | 2011 137210 A | 7/2011 |
| JP | 2012112010 A | 6/2012 |
| JP | WO2012137687 A1 | 10/2012 |
| KR | 100872569 B1 | 12/2008 |
| WO | 02103073 A2 | 12/2002 |
| WO | 2004015152 A1 | 2/2004 |

OTHER PUBLICATIONS

Machine Translation, Morimoto et al., JP 2009-120942, Jun. 2009. (Year: 2009).*
Machine Translation, Maki et al., JP 2006-299377, Nov. 2006. (Year: 2006).*
Int'l Search Report for PCT/EP2015/069550 dated Nov. 26, 2015 (dated Dec. 7, 2015).
DIN EN 10083-3, (May 2007).
Stahlschlüssel 2004, Werkstoff Nr. 1.5528 (2004 German steel codex, material No. 1.5528).
Ellingham, The Ellingham Diagram, J Soc Chem Ind., 1944, 63 125, London.
Georges et al., Measurement and modelling of hydrogen desorption in Al—Si coated boron steel, Steely Hydrogen Conference Proceedings, Sep. 28-29, 2011, pp. 77-87.
Thiele, Die Oxydation von Aluminium- und Aluminium-legierungs-Schmelzen, Aluminium, 1962, pp. 707-715, 780-786, vol. 38.

* cited by examiner ized and allow a reliably regime during hot # FLAT STEEL PRODUCT WITH AN AL-COATING, METHOD FOR PRODUCING THE SAME, STEEL COMPONENT AND METHOD FOR PRODUCING THE SAME

CROSS REFERENCE TO RELATED APPLICATIONS

This application is a U.S. National Stage Entry of International Patent Application Serial Number PCT/EP2015/069550, filed Aug. 26, 2015, which claims priority to European Patent Application No. 14183757.5 filed Sep. 5, 2014, the entire contents of both of which are incorporated herein by reference.

FIELD

The present disclosure generally relates to flat steel products for hot forming that may include a steel substrate from a steel comprising, for example, 0.1-3% by weight Mn and 0.0005-0.01% by weight B and a protective coating, which is applied to the steel substrate, is based on Al, and may in some cases include up to 20% by weight of other alloy elements. The present disclosure also relates to methods for producing such flat steel products. The present disclosure further relates to steel components produced by hot press hardening and methods for producing steel components.

BACKGROUND

MnB steels are standardized in EN 10083-3. these steels are highly hardenable and allow a reliably regime during hot pressing that makes it possible economically to bring about martensite hardening while still in the mold in the course of hot forming, without additional cooling. A typical example of a steel of this kind is that known under the designation 22MnB5, which can be found in the 2004 German steel codex (Stahlschlüssel) under material number 1.5528.

Fully killed 22MnB5 steel available on the market, as well as containing iron and unavoidable impurities, typically contains (in wt %) 0.10-0.250% C, 1.0-1.4% Mn, 0.35-0.4% Si, up to 0.03% P, up to 0.01% S, up to 0.040% Al, up to 0.15% Ti, up to 0.1% Nb, in total up to 0.5% Cr+Mo, and also up to 0.005% B.

For hot-rolled MnB steel sheets provided with an Al coating and intended for production of steel components by hot press hardening, EP 0 971 044 B1 specifies an alloying protocol whereby an MnB steel, in addition to iron and unavoidable impurities, is to have (in wt %) a carbon content of more than 0.20% but less than 0.5%, a manganese content of more than 0.5% but less than 3%, a silicon content of more than 0.1% but less than 0.5%, a chromium content of more than 0.01% but less than 1%, a titanium content of less than 0.2%, an aluminum content of less than 0.1%, a phosphorus content of less than 0.1%, a sulfur content of less 0.05%, and a boron content of more than 0.0005% but less than 0.08%. The Al coating is what is called an AlSi coating, consisting of 9-10 wt % Si, 2-3.5 wt % iron and aluminum as the balance. The coated flat steel products of this nature are heated to a heating temperature of more than 700° C., then inserted into a press mold, formed therein while hot to give the steel component, and at the same time cooled at a rate such that hardened microstructure is developed in the steel substrate of the flat steel product.

In the as-supplied state, all grades of manganese-boron steels are low in hydrogen. The amounts of diffusible hydrogen therein are in each case below the detection limit of currently 0.1 ppm. As a consequence of this, MnB steels display in principle only a low propensity toward belated, hydrogen-induced cracking.

In practice, however, it has emerged that in the hot forming of manganese-boron steels coated with aluminum-based protective coatings, hydrogen accumulates in the steel substrate under relatively moist oven atmospheres. The reason identified for this is a reaction between metal and water vapor. This reaction occurs when the flat steel product for the hot forming, bearing the Al coating, is heated to relatively high temperatures in a heating oven in an atmosphere containing water vapor. In this environment, the water vapor present in the oven atmosphere reacts at the surface of the material to form hydrogen and a metal oxide. The hydrogen formed diffuses into the steel material, where it may result in delayed failure, by concentrating preferentially in regions of high intrinsic tensile stress. If a locally very high hydrogen concentration is reached, this weakens the binding of the grain boundaries of the steel substrate microstructure to an extent such that in use, as a result of the stress that occurs, there is cracking along the grain boundary.

In order to avoid the introduction of hydrogen as a consequence of the surface reaction in the oven, dew point regulators are frequently used. The objective here is to limit the supply of water vapor in the oven atmosphere.

One example of such an approach is the method described in EP 1 767 286 A1. With this method, a flat steel product bearing an Al or Zn coating is hot-formed by heating to a temperature which is not less than the Ac3 temperature and not more than 1100° C. under a dry atmosphere whose hydrogen content is not more than 6 vol %, preferably not more than 1 vol %, and whose dew point is maintained at not more than 10° C. While the steel substrate of the flat steel product thus heated consists preferably of an MnB steel with 0.05-0.5 wt % C, 0.5-3 wt % Mn, and up to 0.05 wt % B, there may be 0.1-1 wt % Cr, 0.5-10 wt % Mg, 0.1-1 wt % Ti or 1-5 wt % Sn in its Al and Zn coating for the purpose of improving the corrosion control. The Al coating in this case is preferably an AlSi coating with 3-15 wt % Si. Iron may be present as an impurity in the Al coating, in amounts of typically 0.05-0.5 wt %. None of the working examples presented in EP 1 767 286 A1, however, is concerned with an AlSi coating which as well as the unavoidable Fe impurities includes an additional alloy constituent.

Particularly in regions where high atmospheric humidity is the rule, the effort and complexity entailed in providing sufficient quantities of dry air or dry nitrogen give rise to considerable operating costs.

DETAILED DESCRIPTION

Figure 1:
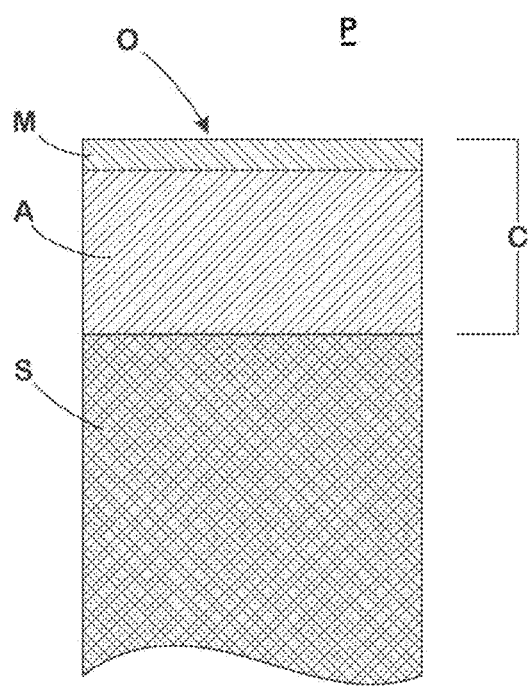
FIG. 1 is a schematic view of a layer construction of an example protective coating present on an example steel component.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a ' element or 'an ' element in the appended claims does not restrict those claims to articles, apparatuses, systems, methods, or that like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

It should be understood that the term 'flat steel product' encompasses all rolled products whose length is much greater than their thickness. They further include steel strips, sheets, blanks, and billets obtained from them as well. Further, references herein to amounts of an alloy should be understood as amounts in 'percent by weight' unless expressly indicated otherwise.

Against the background of the prior art, one example object of the present disclosure is to provide a flat steel product, similar to the example specified in the FIELD, wherein the absorption of hydrogen during heating required for hot forming is minimized. Furthermore, other example objects are to specify a method for producing such a flat steel product, a steel component hot-formed from the flat steel product, and a method for producing a steel component of this kind.

A feature of a steel component achieving the object identified above is that it is produced from a flat steel product of the invention.

A flat steel product of the invention comprises a steel substrate from a steel comprising 0.1-3 wt % Mn and 0.0005-0.01 wt % B and a protective coating, which is applied to the steel substrate, is based on aluminum, and contains optionally in total up to 20 wt % of other alloy elements.

In accordance with the invention, then, the Al-based protective coating comprises as additional alloy constituent in total 0.1-0.5 wt % of at least one alkaline earth metal or transition metal, an oxide of the alkaline earth metal or transition metal being formed on the outer surface of the protective coating during the hot forming of the flat steel product.

The Al-based protective coating comprises as additional alloy constituent preferably in total 0.1-0.5 wt % Mg, magnesium oxide (MgO) being formed on the outer surface of the protective coating after the hot forming of the flat steel product at a heating temperature of at least 700° C.

The additional alloy constituents admixed in small amounts to the Al coating in accordance with the invention are notable for a greater affinity for oxygen than the principal aluminum constituent of the protective coating. In the presence even of such small amounts of an alkaline earth metal or transition metal, a thin oxide layer is formed on the surface of the protective coating, and masks the aluminum situated between it and the steel substrate. On the heating that is required for the hot forming of the flat steel product, this thin layer hinders reaction of the aluminum with the moisture which is present in the atmosphere of the oven used to heat the flat steel product. In this way, oxidation of the aluminum in the coating is effectively prevented, as is an associated release of hydrogen that could diffuse into the coating and into the steel substrate of the flat steel product. This is the case in particular, surprisingly, even when the Al-based coating is in the form locally of a liquid melt, as a consequence of the heating, and its surface opens, causing coating material in the liquid melt to make contact with the oven atmosphere. With flat steel products of the invention, particularly in the case of relatively long annealing times, the hydrogen concentration found in the component hot-formed from the flat steel product is lower in comparison to that of flat steel products provided conventionally with an Al coating.

The invention proposes two different pathways for the production of flat steel products of the invention.

The method pathway preferred in accordance with the invention for producing a flat steel product of the invention envisages the generation of a flat steel product of the invention by providing a steel substrate in the form of a flat steel product produced from a steel which comprises 0.1-3 wt % Mn and up to 0.01 wt % B, more particularly 0.0005-0.01 wt % B, and coating this steel substrate with an Al-based protective coating which comprises 0.1-0.5 wt % of at least one alloy constituent taken from the group of the alkaline earth metals or transition metals and also, optionally, in total up to 20 wt % of other alloy elements. For this coating operation as well, hot dip coating is appropriate, in which case, here, the melt bath used for the hot dip coating has already been alloyed with the additional alloy constituent envisaged in accordance with the invention.

As an alternative, a flat steel product of the invention can also be produced by a method pathway wherein a steel substrate is provided in the form of a flat steel product produced from a steel which comprises 0.1-3 wt % Mn and up to 0.01 wt % B, more particularly 0.0005-0.01 wt % B, and, moreover, may conventionally comprise further alloy constituents in order to adjust its properties, after which this steel substrate is coated with an Al-based protective coating which may optionally comprise further alloy elements in amounts which may in total be up to 25 wt %, and finally a layer is applied to the resultant protective coating that consists of at least one alloy constituent taken from the group of the alkaline earth metals or transition metals, the thickness of the applied layer being such that the amount of the additional alloy constituent, based on the total weight of protective coating and applied layer, is 0.1-0.5 wt %. The layer thicknesses suitable for this purpose are typically in the range of 5-35 μm, more particularly 10-25 μm. A feature of this method variant is that it allows the application of such layer thicknesses with the stated additional alloy constituents which may be admixed deliberately to the coating, in a manner known per se, in order to set particular properties of the coating.

In the production of a flat steel product of the invention, provision may be made in particular for the additional alloy constituent taken from the group of the alkaline earth metals or transition metals to be formed by Mg.

The Al-based protective coating may be applied to the flat steel product in a particularly economic way by hot dip coating, also referred to in the jargon as "hot dip aluminizing".

For application of the layer consisting of the inventively envisaged additional alloy constituent, it is appropriate to use any known method that enables the deposition of sufficiently thin layers on the Al-based coating. Such methods include the known PVD (Physical Vapor Deposition) or CVD (Chemical Vapor Deposition) methods. It is likewise conceivable for the additional layer to be applied by the roller application of an Al foil to the steel substrate in the manner of a roll-bonding operation.

Occupying first place among the alkaline earth metals envisaged additionally, for the purposes of the invention, in the protective coating of a flat steel product of the invention is magnesium—also suitable, as a replacement or a supplement, is calcium, strontium, sodium or barium.

Of the transition metals, use may be made, for example, of Zr and Ti. With the hydrogen that is present in or penetrates the Al protective coating, these transition metals form metallike hydrides, the cleaving of which takes significantly longer than the heating of the flat steel product to the heating temperature to which the flat steel product is heated for hot forming, meaning that the flat steel product at the start of the respective hot forming has the requisite hot forming temperature. To achieve hot forming temperatures in the range of 700-900° C., accordingly, the heating temperature is in practice not less than 700° C.

The total amount of additional alloy elements envisaged in accordance with the invention for the purpose of hindering the uptake of hydrogen by the flat steel product is to be in the range of 0.1-0.5 wt %.

Experiments have revealed here that even small amounts of the at least one additional alloy constituent envisaged in accordance with the invention can be sufficient for the purposes of the invention. Minimal amounts of alloy constituents envisaged additionally for the invention prove favorable here, since in that case the oxidation of the additional alloy constituents is concluded quickly, the surface of the protective coating is passivated with corresponding rapidity, and nor is there any excessive formation of hydrogen owing to the additional alloy constituent.

Consequently, the amounts of the additional alloy constituents envisaged in accordance with the invention for the purpose of hindering the uptake of hydrogen by the flat steel product are limited preferably to less than 0.5 wt %, more particularly less than 0.45 wt % or at most 0.4 wt %. This is valid in particular against the background that experiments here have shown that even with amounts of up to 0.35 wt %, good effects sufficient for the purposes of the invention are achieved.

Where the Al coating is applied as a hot dip coating and the inventively envisaged amount of additional alloy constituents is alloyed into the melt bath, the addition of small amounts has the advantage, besides the optimized hindering of hydrogen uptake, that the risk of formation of substantial quantities of slag on the melt bath, a risk otherwise triggered by the presence of these additional alloy constituents in the melt bath, is minimized. Increased slag formation could be detrimental to coating quality.

An additional alloy constituent having proven particularly suitable for hindering hydrogen uptake is magnesium, which can be alloyed effectively into protective Al coatings of the type in question here. The amount of Mg added is ideally such that the protective coating contains at least 0.1 wt % and not more than 0.5 wt % Mg; for the reasons already elucidated above, Mg contents of less than 0.5 wt %, more particularly less than 0.45 wt % or up to 0.4 wt % or up to 0.35 wt %, have proven particularly favorable in practice for the purposes of the invention.

Calcium in the Al coating of the invention for the purposes of the invention may be present as an additional alloy constituent in amounts of 0.01-0.5 wt %; here as well, for the reasons already elucidated, it is the case that small Ca amounts of up to 0.02 wt % may be advantageous.

For the same reasons, strontium as well may be present as an additional alloy element in a protective coating of the invention, in amounts of 0.005-0.25 wt %. Here again it may be advantageous to limit the amount of Sr to up to 0.15 wt %, more particularly up to 0.10 wt %.

Barium can be added to the protective coating of the invention, as an additional alloy constituent for the purposes of the invention, in amounts of 0.005-0.25 wt %, where, for the reasons elucidated, Ba contents of 0.005-0.05 wt % have proven particularly favorable.

If zirconium and titanium are to be added to the protective coating as additional alloy elements for the purposes of the invention, this may be done in amounts of in each case 0.15-0.7 wt %; for the reasons already elucidated, amounts of not more than 0.5 wt %, more particularly not more than 0.4 wt % or not more than 0.35 wt %, are particularly favorable.

The protective coating of a flat steel product of the invention is typically an AlSi coating which as well as Al comprises 3-15 wt % Si. Typical Si contents of AlSi coatings of this kind are in the range of 9-12 wt %; a standard AlSi coating known from the art contains 10 wt %.

In addition to or as an alternative to the Si content, further alloy constituents may be present in the Al-based protective coating. This includes, in particular, up to 5 wt % Fe, which may enter the coating as an impurity or may be added deliberately for optimized bonding of the coating to the steel substrate of the flat steel product. The level of impurities in the coating may be up to 0.5 wt %.

As already mentioned, no later than during the heating of the flat steel product, the additional alloy constituent envisaged in accordance with the invention forms a thin oxide layer with the water with which the atmosphere of the oven is laden, on the surface of the protective coating, and this oxide layer hinders the penetration of hydrogen into the flat steel product and hinders further, hydrogen-releasing oxidation of the aluminum in the protective coating. In the case of the steel component hot-formed from a flat steel product of the invention, the thickness of this layer is only up to 200 nm; in practice, layer thicknesses of up to 100 nm have proven sufficient.

A steel component of the invention can be produced by generating a flat steel product of the invention in the manner elucidated above, then heating the flat steel product to a hot forming temperature, the heating taking place under ambient atmosphere or $H_2O$-reduced atmosphere, and, finally, hot-forming the heated flat steel product to give the steel component.

Hot forming here may be performed in a known manner by the hot forming temperature being such that the microstructure of the steel substrate is austenitic, and by the flat steel product after forming (two-stage operation) or in the course of forming, i.e., while still in the forming mold (one-stage operation), being quenched, so that hardened microstructure is formed in the microstructure of the steel substrate of the flat steel product.

The experiments carried out to verify the effect of the invention were conducted using four samples, E1, E2, E3, and V, of a steel strip consisting of an MnB steel, with a composition as reported in table 1.

TABLE 1

| C | Si | Mn | P | S | Al | Ti | Cr + Mo | B |
|---|----|----|---|---|----|----|---------|---|
| 0.22 | 0.25 | 1.16 | 0.014 | 0.002 | 0.038 | 0.023 | 0.21 | 0.0026 | balance iron and unavoidable impurities, figures in wt %

Samples E1, E2, E3, and V, which at this point in time are hydrogen-free, are each provided by hot dip coating with a protective AlSi coating having a composition as reported in table 2.

TABLE 2

| Sample | Si | Mg | Fe |
|--------|----|------|--------|
| E1 | 10 | 0.4 | up to 3 |
| E2 | 10 | 0.3 | up to 3 |
| E3 | 10 | 0.05 | up to 3 |
| V | 10 | — | up to 3 | balance aluminum and unavoidable impurities, figures in wt %

The minimum add-on weight of the protective coating was 120 g/m² in each case.

The flat steel product samples E1, E2, E3, and V thus provided with a protective coating were each heated on travel through an oven, for an annealing time GD of 360 s, 600 s or 800 s (see FIG. 4), under a standard atmosphere with a dew point of +14.0° C., to 900° C. Subsequently they were transported within a transfer time of 4-6 seconds into a hot press mold, where they were hot-formed to give a component. In the course of the hot forming, the respective sample was cooled at a rate such that hardened microstructure was formed in the microstructure of its steel substrate.

As shown schematically in FIG. 1, in the case of inventive samples E1, E2, and E3, whose protective coating "C", present on the steel substrate "S" and comprising FeAl(Si) compounds contains Mg as an additional alloy constituent in each case, came over the course of the annealing treatment to have a thin MgO layer "M" adjoining the surface O of the protective coating S and containing $Al_2O_3$ as well as MgO. The layer M shields the underlying AlSi layer "A", comprising the FeAl(Si) compounds, from the moist oven atmosphere "P" and so prevents excessive oxidation of the aluminum in the layer A.

Figure 2:
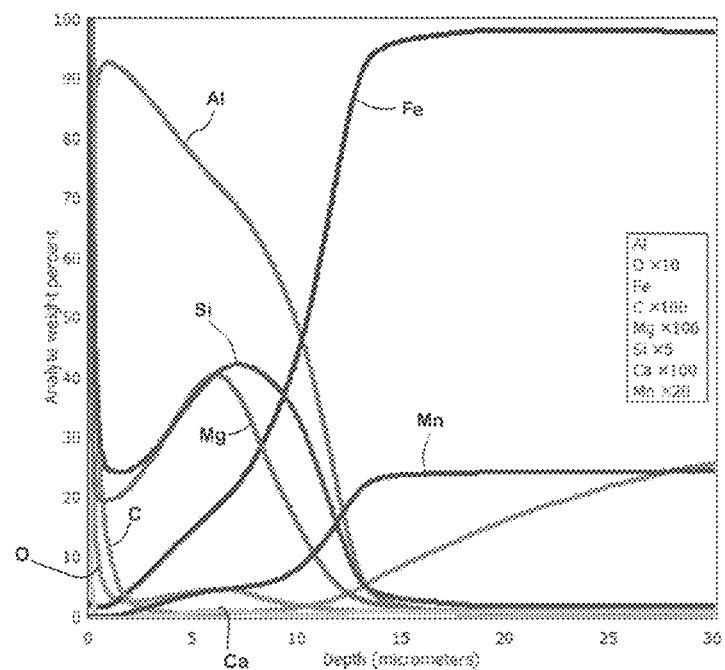
FIG. 2 is a diagram showing an outcome of a GDOES measurement of near-surface layers of an example flat steel product after hot dip coating, but before hot press hardening.
Figure 3:
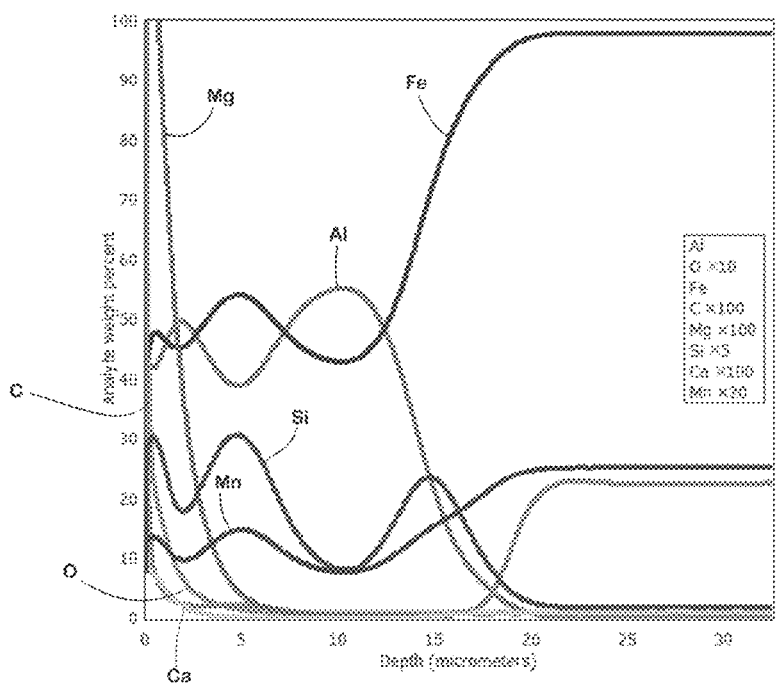
FIG. 3 is a diagram of an outcome of a GDOES measurement of near-surface layers of an example flat steel product after hot press hardening.

For the sample E1, FIG. 2 shows the outcome of GDOES analysis of the protective coating after hot dip coating and before hot press hardening, and FIG. 3 shows the outcome of GDOES analysis of the protective coating after hot press hardening. It is evident that both before and after the hot press hardening, a thin Mg layer is present on the AlSi coating.

A comparison of FIGS. 2 and 3 shows that the magnesium fraction prior to press hardening is distributed essentially uniformly within the layer (FIG. 2), whereas after press hardening it has accumulated in a near-surface layer (FIG. 3).

For the steel components generated in this way from the samples E1, E2, E3, and V, the hydrogen content Hdiff was determined, being the amount of hydrogen diffused into the steel substrate in the course of the heat treatment.

Figure 4:
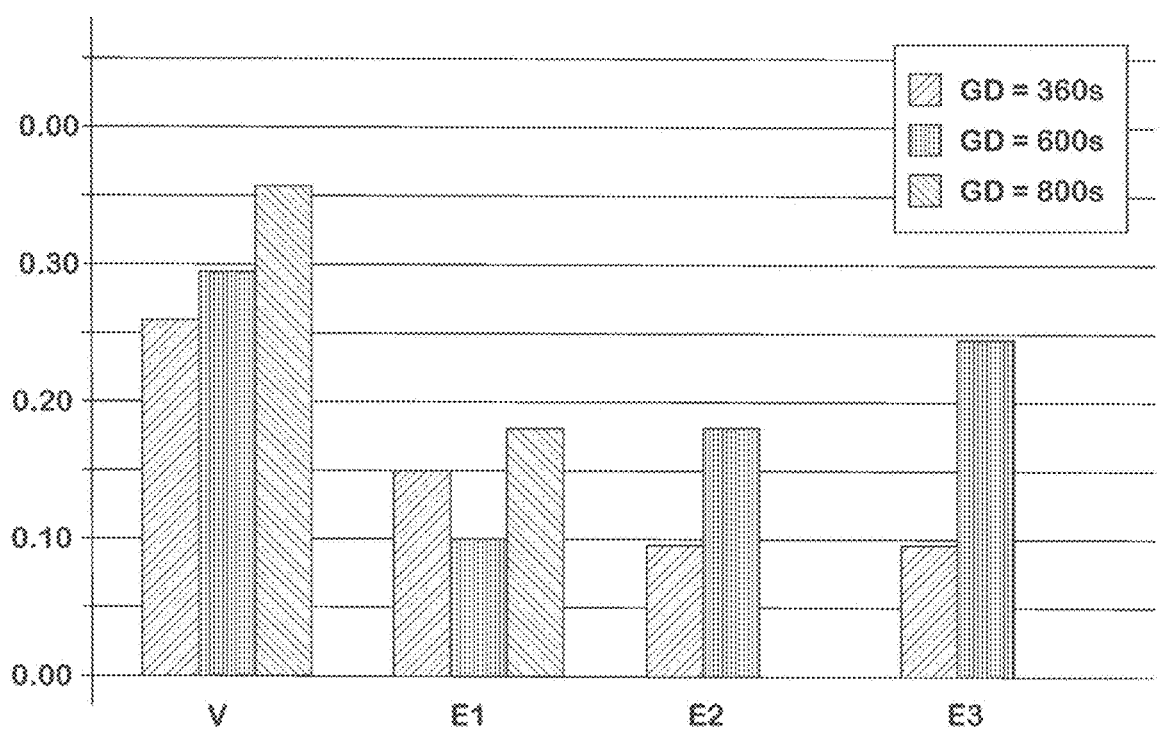
FIG. 4 is a diagram contrasting hydrogen uptake over various annealing times of flat steel products provided with a conventional protective AlSi coating and flat steel products provided with example protective coatings of the present disclosure.

FIG. 4 compares the results of these analyses for the samples E1, E2, E3, and V, calcined for different periods of time. It is found that the protective coatings of the invention produce a decisive reduction in hydrogen uptake even when Mg is present only in very small amounts in the protective coating.

What is claimed is:

1. A flat steel product for hot forming that comprises:
    a steel substrate from a steel that includes 0.1-3% by weight Mn and 0.0005%-0.01% by weight B; and
    a protective coating applied to the steel substrate, the protective coating comprising 3-15% by weight Si, 0.31-0.5% by weight in total of alloy constituents which have a greater affinity for oxygen than Al, and the remainder Al,
    wherein at least two of the alloy constituents are elements selected from the group consisting of alkaline earth and transition metals,
    wherein the Mg content of the protective coating is 0.3-0.5% by weight and the Ca content of the protective coating is 0.01-0.5% by weight, and
    wherein an oxide of the at least two elements selected from the group consisting of alkaline earth and transition metals is formed on an outer surface of the protective coating during hot forming of the flat steel product.

2. The flat steel product of claim 1 wherein an Mg content of the protective coating is 0.3%-0.4% by weight.

3. The flat steel product of claim 1 wherein, in addition to the alloy constituents, the protective coating includes up to 20% by weight of other alloy elements.

4. The flat steel product of claim 1 wherein the protective coating includes up to 5% by weight Fe.

5. The flat steel product of claim 1 wherein the protective coating is a hot dip coating.

6. A steel component produced by hot press forming the flat steel product of claim 1, wherein the oxide of the at least two elements selected from the group consisting of alkaline earth and transition metals is formed on an outer surface of the protective coating during hot forming of the flat steel product.

7. The steel component of claim 6 wherein the alloy constituents are present in a layer that forms a finish of the protective coating relative to surroundings and that has a thickness of up to 200 nm.

8. A method for producing a steel product, the method comprising:
    providing a steel substrate in a form of a flat steel product produced from a steel that comprises 0.1-3% by weight Mn and 0.0005-0.01% by weight B;
    coating the steel substrate with a coating that comprises 3-15% by weight Si, 0.31-0.5% by weight in total of alloy constituents which have a greater affinity for oxygen than Al, and the remainder Al, wherein at least two of the alloy constituents are elements selected from the group of alkaline earth and transition metals, and wherein the Mg content of the protective coating is 0.3-0.5% by weight and the Ca content of the protective coating is 0.01-0.5% by weight; and
    forming an oxide of the at least two alloy constituents selected from the group of alkaline earth and transition metals on an outer surface of the Al-based protective coating during hot forming of the flat steel product.

9. The method of claim 8 wherein the Al-based protective coating is applied to the steel substrate by hot dip coating.

10. The method of claim 8 wherein, in addition to the alloy constituents, the Al-based protective coating further comprises up to 20% by weight of other alloy elements.

11. A method for producing a steel component produced by hot press forming a flat steel product that comprises a steel substrate comprising steel that includes 0.1-3% by weight Mn and 0.0005-0.01% by weight B, and a protective coating applied to the steel substrate, wherein the protective coating comprises 3-15% by weight Si, 0.3-0.5% by weight of Mg, 0.01-0.5% by weight of Ca, and the remainder Al, wherein an oxide of the Mg and an oxide of Ca are each formed on an outer surface of the protective coating, wherein the alloy constituent is present in a layer that forms a finish of the protective coating relative to surroundings and that has a thickness of up to 200 nm, the method comprising:

heating the flat steel product to a heating temperature for hot forming, wherein the heating occurs under an ambient atmosphere or under an $H_2O$-reduced atmosphere; and hot forming the flat steel product to create the steel component.

12. The method of claim 11 wherein the oxides are formed during the hot forming of the flat steel product.

13. The method of claim 11 wherein a level of the heating temperature is such that at a start of forming the flat steel product has a hot forming temperature at which a microstructure of the steel substrate is austenitic, wherein the flat steel product is quenched after or during the hot forming so that a hardened microstructure forms in the microstructure of the steel substrate of the flat steel product.

14. The method of claim 13 wherein the heating temperature is at least 700° C.

15. The method of claim 11 wherein the protective coating include up to 20% by weight of other alloy elements.

\* \* \* \* \*